(12) United States Patent
Janik

(10) Patent No.: US 11,674,281 B2
(45) Date of Patent: *Jun. 13, 2023

(54) SYSTEM AND METHOD FOR DYNAMICALLY BALANCING LOADS ON LEGS SUPPORTING A JACK UP RIG PLATFORM

(71) Applicant: ELECTRONIC POWER DESIGN, INC., Houston, TX (US)

(72) Inventor: John Bradford Janik, Houston, TX (US)

(73) Assignee: ELECTRONIC POWER DESIGN, INC., Houston, TX (US)

(*) Notice: Subject to any disclaimer, the term of this patent is extended or adjusted under 35 U.S.C. 154(b) by 1140 days.

This patent is subject to a terminal disclaimer.

(21) Appl. No.: 16/260,166

(22) Filed: Jan. 29, 2019

(65) Prior Publication Data

US 2019/0257052 A1    Aug. 22, 2019

Related U.S. Application Data

(63) Continuation-in-part of application No. 15/415,626, filed on Jan. 25, 2017, now Pat. No. 10,190,278.

(51) Int. Cl.
| | |
|---|---|
| E02B 17/08 | (2006.01) |
| E02B 17/04 | (2006.01) |
| E02B 17/02 | (2006.01) |
| E02B 17/00 | (2006.01) |
| G05B 13/02 | (2006.01) |

(52) U.S. Cl.
CPC ........ *E02B 17/021* (2013.01); *E02B 17/0017* (2013.01); *E02B 17/04* (2013.01); *E02B 17/08* (2013.01); *E02B 17/0836* (2013.01); *G05B 13/027* (2013.01); *E02B 17/0863* (2013.01); *E02B 2017/0056* (2013.01)

(58) Field of Classification Search
CPC ...... E02B 17/04; E02B 17/08; E02B 17/0818; E02B 17/021; E02B 17/017; E02B 17/0836; G05B 13/027
See application file for complete search history.

(56) References Cited

U.S. PATENT DOCUMENTS 4,495,824 A * 1/1985 Dantan ............... E02B 17/0818
73/862.542
4,813,814 A * 3/1989 Shibuta ............... E02B 17/0818
405/196

(Continued)

FOREIGN PATENT DOCUMENTS

WO    WO-2016028935 A1 * 2/2016 ......... E02B 17/0034

*Primary Examiner* — Frederick L Lagman
(74) *Attorney, Agent, or Firm* — G. Michael Roebuck (57) ABSTRACT

A system is disclosed including but not limited to a a jack up processor in data communication with each for dynamically balancing loads in real time on a plurality of legs supporting a jack up rig platform having a plurality of gear box motors on the plurality of legs. A processor reads data from sensors on gear box motors on the legs and selects a stored torque profile from a computer readable medium based on the load data from the sensors; and sends the torque profile to the plurality of gearboxes. A computer readable medium and neural network are disclosed for dynamically balancing loads on the plurality of legs in real time.

19 Claims, 5 Drawing Sheets

(56) References Cited

U.S. PATENT DOCUMENTS

| | | | | |
|---|---|---|---|---|
| 4,885,698 | A * | 12/1989 | Kawasaki | E02B 17/0818 |
| | | | | 318/8 |
| 5,486,069 | A * | 1/1996 | Breeden | E02B 17/06 |
| | | | | 405/196 |
| 5,611,645 | A * | 3/1997 | Breeden | E02B 17/0818 |
| | | | | 405/196 |
| 7,186,061 | B2 * | 3/2007 | Foo | E02B 17/06 |
| | | | | 405/196 |
| 8,336,388 | B2 * | 12/2012 | Lenders | G01L 3/02 |
| | | | | 73/786 |
| 10,190,278 | B2 * | 1/2019 | Janik | E02B 17/0818 |
| 10,889,961 | B2 * | 1/2021 | Unger | E02F 9/04 |
| 2006/0062637 | A1 * | 3/2006 | Foo | E02B 17/06 |
| | | | | 405/198 |
| 2009/0090191 | A1 * | 4/2009 | Lenders | E02B 17/021 |
| | | | | 73/786 |
| 2010/0104375 | A1 * | 4/2010 | Kaarstad | E02B 17/08 |
| | | | | 405/198 |
| 2012/0050056 | A1 * | 3/2012 | Lenders | E02B 17/0818 |
| | | | | 340/665 |
| 2016/0055280 | A1 * | 2/2016 | Devoy | G06F 30/23 |
| | | | | 703/2 |
| 2019/0048558 | A1 * | 2/2019 | Unger | B62D 57/022 |

* cited by examiner

SYSTEM AND METHOD FOR DYNAMICALLY BALANCING LOADS ON LEGS SUPPORTING A JACK UP RIG PLATFORM

CROSS REFERENCE TO RELATED APPLICATIONS

This patent application is a continuation in part of U.S. patent application Ser. No. 16/415,626 now U.S. Pat. No. 10,190,278, by John B. Janik, entitled "System and Method for Controlling a Jack-Up Rig", filed on Jan. 25, 2017; and U.S. Provisional Patent Application No. 62/286,763 by John B. Janik, entitled "System and Method for Controlling a Jack-Up Rig", filed on Jan. 25, 2016, and claims priority from U.S. patent application Ser. No. 14/558,489 filed on Dec. 2, 2014 now U.S. Pat. No. 9,365,265 by John B. Janik, issued on May 25, 2016 and entitled "Hybrid Winch with Controlled Release and Torque Impulse Generation" and claims priority from U.S. Provisional Patent Application No. 62/297,636 filed on Feb. 19, 2016 by John B. Janik entitled SYSTEM AND METHOD FOR HYBRID POWER GENERATION; U.S. patent application Ser. No. 15/415,626 by John B. Janik, entitled "System and Method for Controlling a Jack-Up Rig", filed on Jan. 25, 2017, all of the above which are hereby incorporated by reference herein in their entirety.

BACKGROUND OF THE INVENTION

A jack up rig or a self-elevating unit is a type of mobile platform that consists of a buoyant hull fitted with a plurality of movable legs, capable of raising its hull over the surface of the sea. In the past jack up rigs have been subject to noise on communication busses controlling the jack up rigs. The jack up rigs of the past have also be subject to inefficiencies and single point failures due to lack of individual control of gearbox motors used to raise and lower the moveable legs.

FIELD OF THE INVENTION

The invention relates to jack up rigs and in particular to control of gearbox motors used to raise and lower the legs of the jack up rig.

SUMMARY OF THE INVENTION

A system and method for dynamically balancing a loads on legs supporting a jack up rig.

BRIEF DESCRIPTION OF THE DRAWINGS

The invention will be better understood in reference to the following drawings, which are examples of an illustrative embodiment and are not limiting as different embodiments of the invention may be realized.

DETAILED DESCRIPTION OF THE INVENTION

A jack up drilling rig is an oil drilling platform that stands above the water level, and (normally three or four) legs that reach down to the ocean floor for the drilling rig to stand on. The legs can be retracted (jacked up) so that they no longer reach into the sea and instead tower over the top of the platform while it floats on the surface of the water. This allows the jack up drilling rig to be towed to a desired location.

A three-legged jack up rig platform is triangular in shape with a vertical jack up legs in each corner of a horizontal jack up rig platform. The three vertical legs are raised and lowered on ratchets. The legs are lowered causing the rig to go up during jacking up. The legs are raised, and rig goes down during jacking down. Vertical leg members form an outside of a vertical leg are called chords. The chords have teeth that are engaged by gearbox motors to raise and lower the jack up rig. Legs that have four chords can have a square cross-section. The vertical jack up legs that have three chords have a triangular cross-section. The vertical jack up legs are jacked up and down by a plurality of individually controlled by jacking motors, which drive cogs that move notches on the jacking chords up and down. This is known as a rack and pinion system. The rack is the series of notches on the chord and the pinion is the gear whose teeth interlock with the rack.

In a particular illustrative embodiment of the invention, a jack up rig control system including but not limited to a jack up controller, having a processor and a computer readable medium for program instructions and data, is provided to control a plurality of gearbox motors on each of a plurality vertical legs that are controlled to raise and lower the jack up rig. In a particular illustrative embodiment of the invention, the jack up rig has three legs. Twelve gearbox motors are provided on each one of the three legs for a total of 36 individual gearbox motors on a three-legged jack up rig. Each of the plurality of 36 gearbox motors is individually controlled and monitored by the jack up rig controller. The jack up rig controller sends a speed reference value over a first unidirectional communication link in a first network to each of the gearbox motors to move the leg up and down. In another particular illustrative embodiment of the invention the jack up rig controller sends a load value to each one of the gearbox motors. The jack up rig controller receives a speed reference value over a second unidirectional communication link on a second network from each of the gear motors. In another embodiment of the invention, the jack up rig controller receives a load value from each one of the 36 gearbox motors. The first and second unidirectional communication links on the first and second network provide for less noise and better security than provided by an analog communication line on an analog communication network. In a particular illustrative embodiment of the invention, the first and second unidirectional communication links are fiber optic cables. The unidirectional or "one way" communication links on the first and second network provide for improved security to over security provided by a bidirectional communication link or a bidirectional communication network. The unidirectional links help to deter hacking of the jack up rig controller and gearbox controllers. Each gearbox is attached to a gear box controller that receives speed reference set point values and load values from the jack up rig controller. The terms "processor" and "controller" are use synonymously herein.

In another illustrative embodiment of the invention, a method for using the jack up rig control system is also provided. The jack up rig controller further includes but is not limited to a computer program in a non-transitory computer readable medium that is provided for sending speed reference values to each one of the gear box motor controllers and receiving speed values and load values individually from each one of the gear box motor controllers. Each one of the gear box controllers further includes but is not limited to a computer program in a non-transitory computer readable medium that is provided for receiving speed reference values and load values for each one of the gear box motor controllers and sending speed values and load values individually from each one of the gear box motor controllers to the jack up rig controller.

Figure 1:
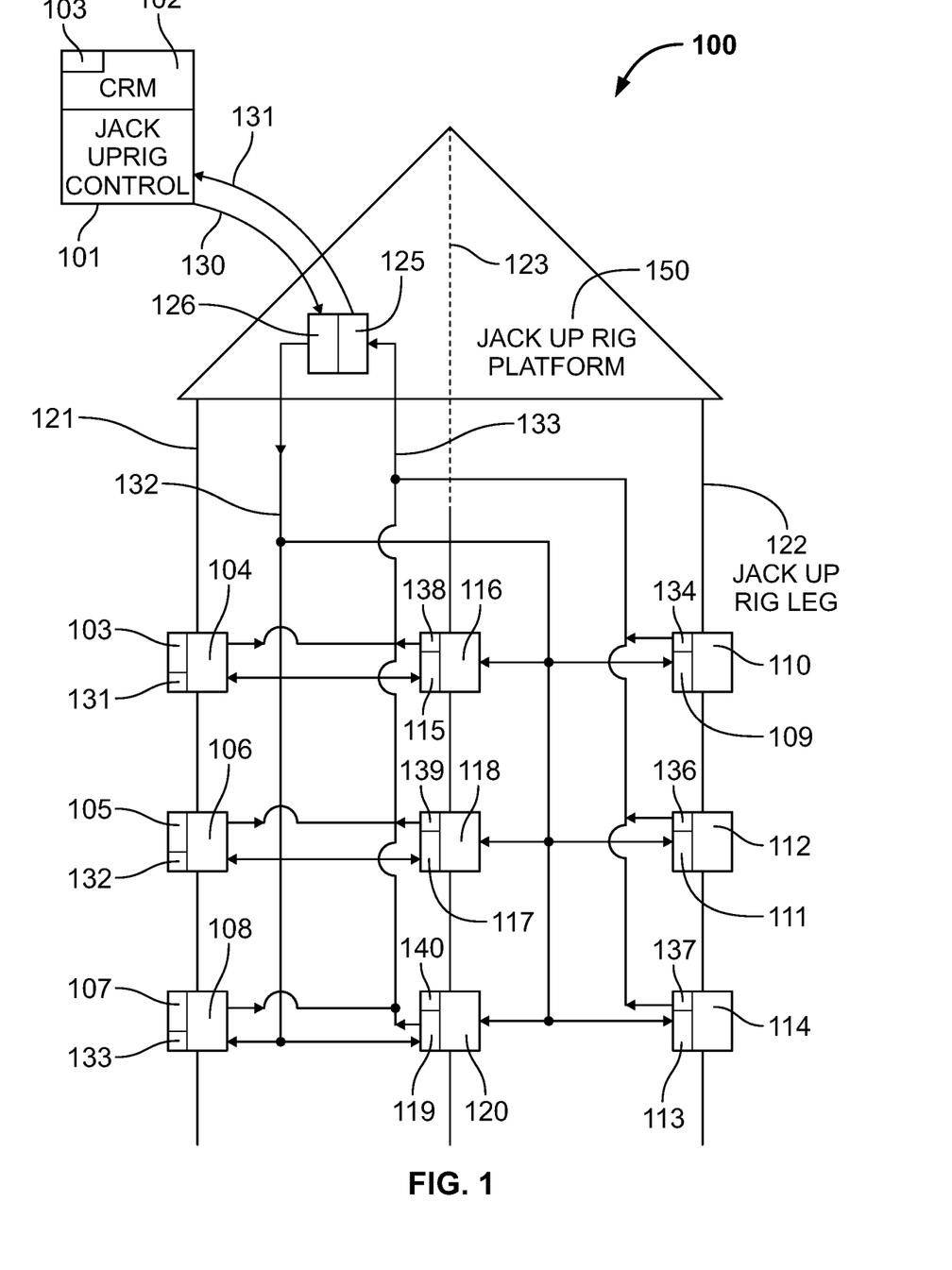
FIG. 1 is a depiction of an illustrative embodiment of a jack up rig having individually controlled gearbox motors in an illustrative embodiment.

Turning now to FIG. 1, FIG. 1 is a schematic depiction of a particular illustrative embodiment 100 of the invention as a jack up rig control system of the present invention, wherein a jack up rig controller 101 executes a computer program 103 stored in computer readable medium 102 to send control signals to each of a plurality of gearbox processors 103, 105, 107, 109, 111, 113, 115, 117 and 119 over a first unidirectional communication links 130, 132 and receives sensor data over a second unidirectional communication link 131, 133 from each of a plurality of sensors 131, 132, 133, 134, 135, 136, 137, 138, 139 and 140 on the plurality of gearbox motor processors 103, 105, 107, 109, 111, 113, 115, 117 and 119 to control lowering and raising of the jack up platform 150 by raising and lowering jack up rig legs 121, 122 and 123. The jack up rig controller receives a load value for each gearbox motor processor that reads a load value from each sensor 131, 132, 133, 134, 135, 136, 137, 138, 139 and 140 on each one of the individual gearbox motors. As shown in FIG. 1, in one particular illustrative embodiment of the present invention, a jack up rig controller 101 sends a speed reference value over unidirectional links 140, 126, 142 to each of the plurality of gearbox motors 106. The controller receives individual feedback 102 signals over second unidirectional links 141, 125, 143 from each of the plurality sensors on the gear box motors. The jack up rig controller sends a speed control point as a numerical value in a digital message over the unidirectional communication link to each one of the gearbox motors to control lowering and raising of the jack up rig. The jack up rig legs (also referred to as "chords") 121, 122 and 123 of the jack up rig are shown in FIG. 1.

Figure 2:
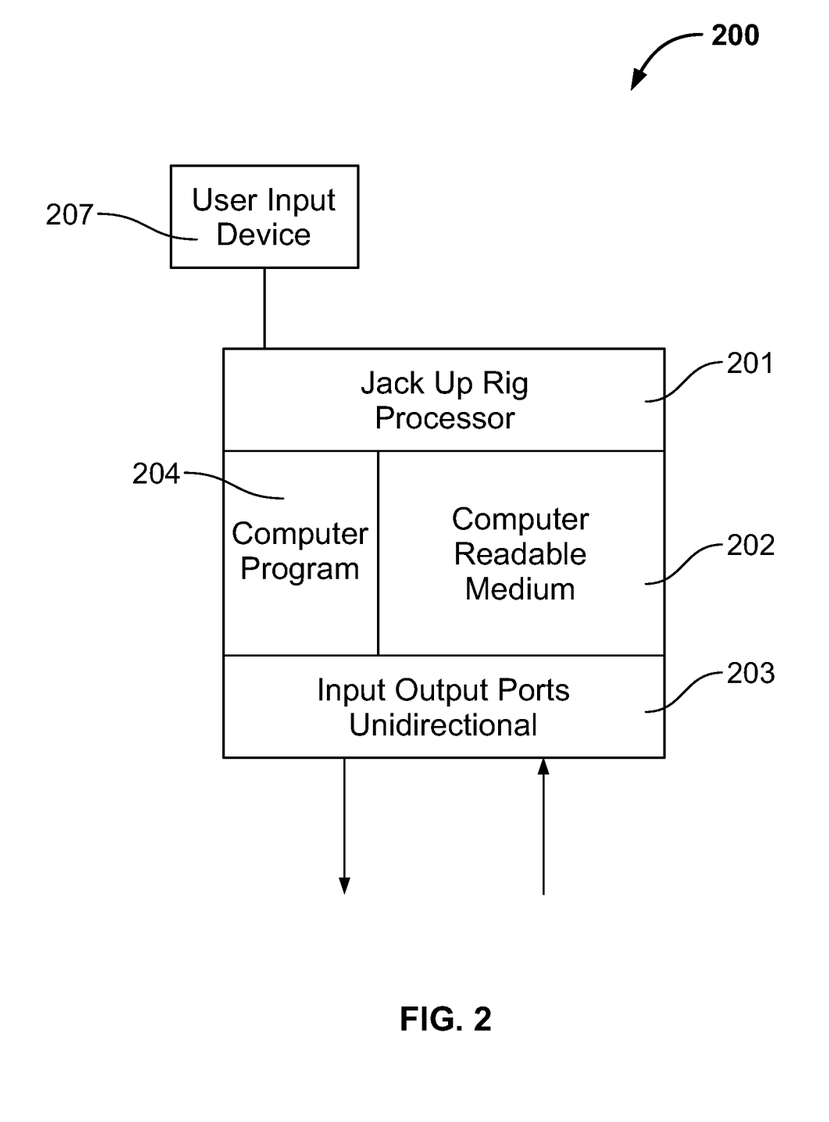
FIG. 2 is a depiction of an illustrative embodiment of a jack up rig processor.

FIG. 2 is a depiction of an illustrative embodiment of a jack up rig processor having a processor 201, computer readable medium 202, computer program 204 and unidirectional input and output ports 203.

Figure 3:
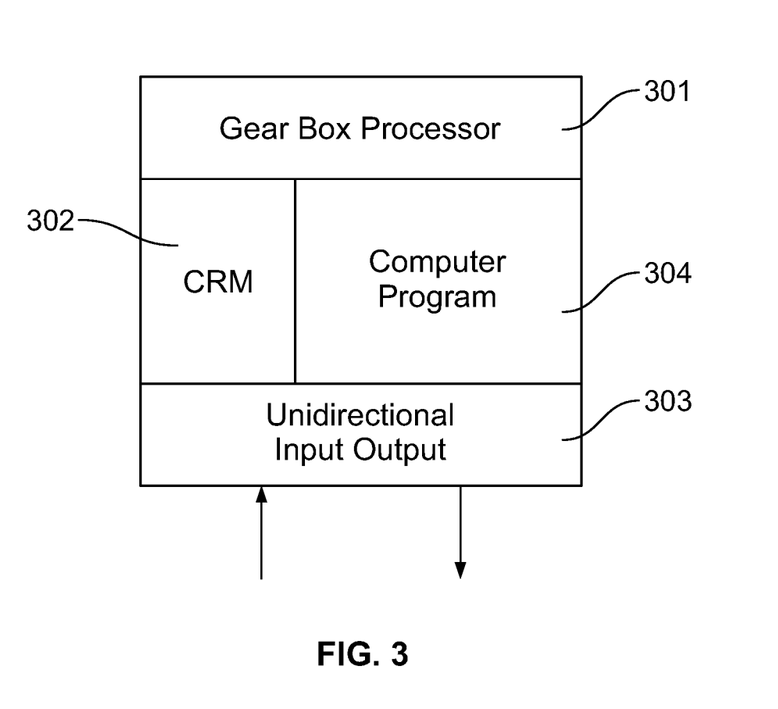
FIG. 3 is a depiction of an illustrative embodiment of a jack up rig processor and sensor.

FIG. 3 is a depiction of an illustrative embodiment of a gearbox processor having a processor 301, computer readable medium 302, computer program 304 and unidirectional input and output ports 303.

Figure 4:
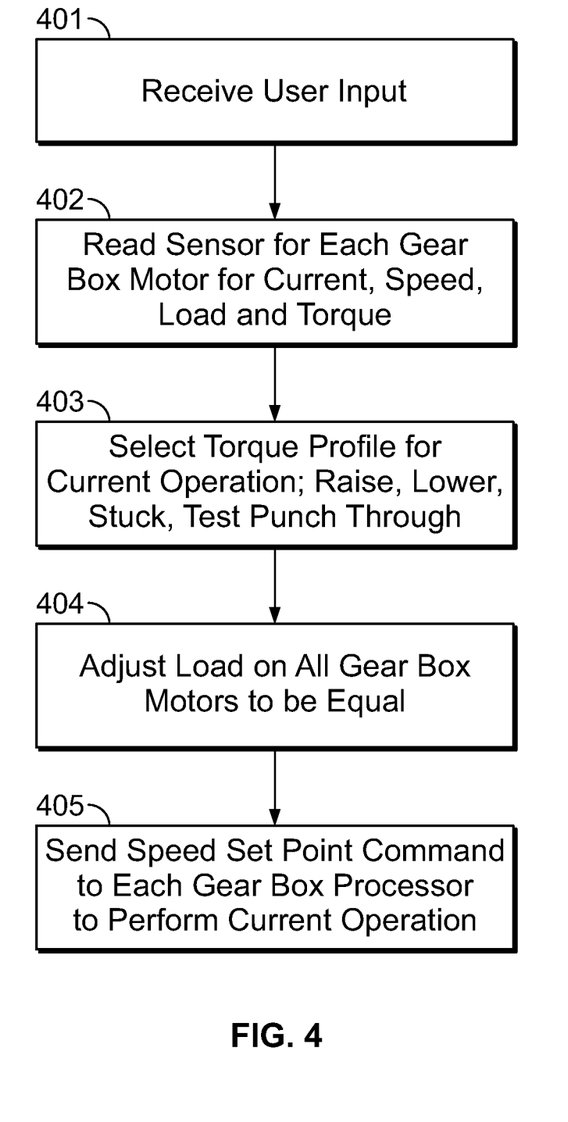
FIG. 4 is a depiction of a flow chart of operations of a method and system in accordance with an illustrative embodiment of the invention.

FIG. 4 is a depiction of a flow chart of operations of a method and system in accordance with an illustrative embodiment of the invention. A computer program in the jack up rig computer readable medium is executed by the jack up rig processor to perform the function performed as shown in FIG. 4. As shown in FIG. 4, at 401 the jack up rig controller receives an input from user input device 207. The user controls the operation of the jack up rig. The user selects an operation including but not limited to: 1) raising and lower legs; 2) apply a torque impulse when one of the jack up rig legs is stuck; 3) applying additional impulse power to test an ocean floor for punch throw on a particular jack up rig leg; and 4) balancing a platform load between the legs supporting the platform. At 402 the jack up rig controller reads the sensors for the gearboxes for current, speed, load and torque. At 403 the jack up rig selects a stored torque profile for the current operation raising and lower legs when one of the jack up rig legs is stuck or additional impulse power is desired to test an ocean floor for punch throw on a particular jack up rig leg. At 404 the jack up rig controller sends speed set point and load commands to adjust the load on each one of gearbox motors on a single jack up rig leg so that the load is shared equally between all working gearbox motors on the single jack up rig leg. At 405 the jack up rig controller sends speed set point commands individually to each one of the gearbox processors to perform the current operation selected operation raising and lower legs when one of the jack up rig legs is stuck or additional impulse power is desired to test an ocean floor for punch throw on a particular jack up rig leg.

Figure 5:
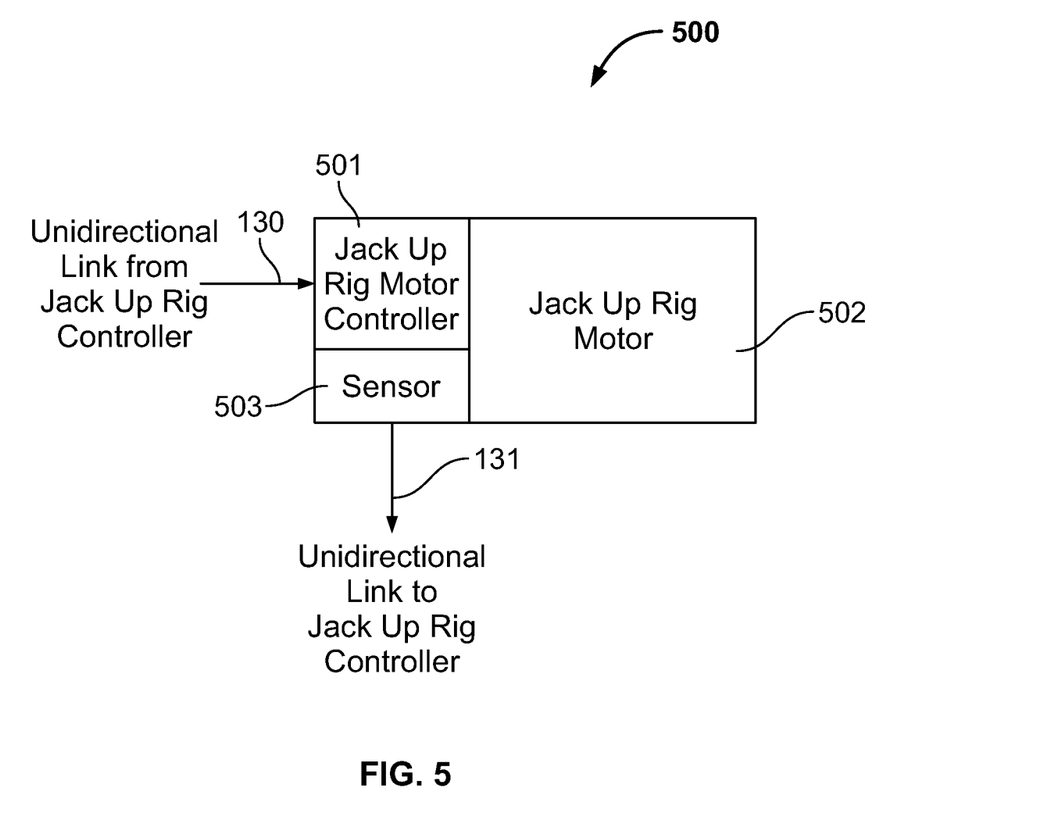
FIG. 5 is a depiction of an illustrative embodiment of a gearbox motor controller (jack up rig motor controller) attached to a gearbox motor (jack up motor) and sensor.

FIG. 5 is a depiction of an illustrative embodiment 500 of a gearbox motor controller (jack up rig motor controller) 501 attached to a gearbox motor (jack up motor) 502 and sensor 503. The sensor measures a load, current, speed and torque of the gear box motor and sends the measurement to the jack up rig controller over unidirectional line 131. The gear box motor controller 501 receives load, current, speed set point commands from the jack up rig processor.

In another particular illustrative embodiment of the invention, the jack up rig controller is programmed to send an individual speed reference value and load value to each one of the each of the plurality of gearbox motor controllers. The speed reference value includes but is not limited to a digital representation of a numerical value of speed reference set point and a load value. In a particular illustrative embodiment, the speed reference value is a speed reference set point that is a numerical value between 0 and 100% of a maximum speed reference set point in which a gearbox motor is capable of operating. The speed reference value is calculated individually for each one of the plurality of gear box motors. The load value is sent as a speed reference to the gearbox motor controllers. Aggregate monitoring of loads on gearbox motors and Aggregate control of loads on the gearbox motors is well known in the art in contrast to the individual control and monitoring of the gearbox motors of the present invention.

Sensors on each one of the individual drive motors detect current levels and load values in the gearbox motor on which the sensor is attached. The "gearbox drive motor" is also referred to herein as a "gearbox motor". The sensor measures a current on the gearbox motor to which it is attached that indicates that the cogs on the gearbox motor are engaged with the notches on the chord of the vertical leg the particular gearbox motor is jacking up or down. In another illustrative embodiment, the sensors detect a load value on the drive motor on which the sensor is attached. In another particular illustrative embodiment of the invention the load value is a torque value for the gearbox motor to which a sensor is attached. In another particular illustrative embodiment of the invention, the load value and current value are measured by the sensors while the gearbox motor is engaged with the jack up rig leg while raising and lowering the jack up rig. In another embodiment, the load value and current values are measured by the sensors while the leg is at rest and a brake is applied to the leg to prevent movement of the leg. The load value is sent to the jack up rig processor over the second set of unidirectional communication links 141, 125 and 143. For example, if there are twelve jacking motors on one chord that engage the notches on the chord to move the chord and the jack up rig leg to which the chord is attached, up and down. The jack up processor monitors gearbox motor current and gearbox motor load individually for each one of the twelve motors. The current value for each one of the gearbox motors is measured individually at each of the gearbox motors and a value for a gearbox motor current and gearbox motor load is sent from the individual gearbox motor to the jack up processor over a first unidirectional (one-way communication) communication line. In a particular illustrative embodiment, the first unidirectional communication line is on a first network. The jack up rig processor receives a current value and a load value for each sensor for each one of the twelve gearbox motors on each one of the three vertical jack up rig legs 121, 122 and 123. Each one of the three legs are controlled individually to substantially ensure that each gearbox motor on a leg is properly loaded and thus engaged with the rack on the jack up rig leg. The three legs are also compared to equally distribute a load between each one of the jack up rig legs attached to jack up rig platform 150. In a particular illustrative embodiment of the invention, when the jack up rig processor determines that a current value for a first one of the twelve gearbox motors is less than half of the current values for a top six current values for the twelve gearbox motors on the chord, the processor sends a speed set point command to the first one gearbox motor to cause the first one gearbox motor to engage the chord. In another particular illustrative embodiment of the invention the jack up rig processor the jack up rig processor receives a load value for a sensor on each one of the twelve gearbox motors on a single leg. The jack up rig processor sends a speed set point command to each one of the twelve gearbox motors to cause the one gearbox motors to engage the leg and equalize the load on each one of the twelve gearbox motors. In a particular illustrative embodiment of the invention, this load equalization is performed while a brake is on the leg. In another particular illustrative embodiment, the invention, load equalization is performed twelve gearbox motors are raising or lowering the leg. Aggregate torque control and aggregate current control of gearbox motors on a jack up rig is well known in the art. Individual torque control, speed control and current control as used in embodiments of the present invention are novel. While the present example proved twelve gearbox motors per leg, there can be any number of legs desired, for example, 24 per leg or 40 per leg.

In another particular illustrative embodiment of the invention, a system and method are provided including but not limited to a jack up rig processor and a plurality of twelve individual gearbox motors and a load sensor on each one the gearbox motors that evenly distributes a leg load across the various pinions attached to the twelve gearbox motors. This substantially increases the system's overall reliability and the fatigue life of the specific teeth that support the leg load. This system and method are suitable for installation on a new jack up rig or on the drive input of an existing jacking rig system as a retrofit. A variable frequency gearbox drive motor is adapted to the input on the gearbox of an existing drive at the proper horse power and torque capability for control by a speed reference set point. In a particular illustrative embodiment of the invention the gearbox motors are variable frequency motors.

In another particular illustrative embodiment, the Jack Up Rig Controller uses the speed set point command to generate a torque impulse to control of the gearbox motors on a particular one of the jack up rig legs for raising and lower legs when one of the jack up rig legs is stuck or additional impulse power is desired to test an ocean floor for punch through on a particular jack up rig leg, as described in U.S. Pat. No. 9,365,265 by John B. Janik, issued on May 25, 2016 and entitled "Hybrid Winch with Controlled Release and Torque Impulse Generation". The impulse is distributed along the jack up rig leg for impulse testing for punch through.

Different controlled torque profiles are stored in the non-transitory computer readable medium and are selected based on the stage of raising and lowering the jack up rig legs and the each of the jack up rig legs engagement with the ocean floor. A torque profile defines a torque verses time relationship and a tension versus time for applying torque to each of the plurality of gearbox motor processor during raising and lower of the jack up rig legs. A first set of torque profiles for the jack up rig control system are stored in the non-transitory computer readable medium and are selected to perform raising jack up rig legs and lowering of jack up rig legs. A second set of torque profiles for the jack up rig control system are stored in the non-transitory computer readable medium and are selected to perform equalizing a load between all jack up rig legs attached to a single jack up rig platform. A third set of torque profiles are stored in the non-transitory computer readable medium and are selected to perform and testing each one of the jack up rig legs for punch through on the ocean floor. In one embodiment of the present system, a neural network computer program is provided to learn successful torque profiles for raising and lower the jack up rig legs, equalizing a load between all jack up rig legs attached to a single jack up rig platform and to perform and testing each one of the jack up rig legs for punch though on the ocean floor. Speed reference set points are sent to the individual gear box processors from the jack up rig controller as indicated by a torque profile selected for a particular operation including but not limited to raising and lower the jack up rig legs, equalizing a load between all jack up rig legs attached to a single jack up rig platform and to perform and testing each one of the jack up rig legs for punch though on the ocean floor. In another embodiment of the invention, load commands are sent to the individual gear box processors from the jack up rig controller as indicated by a torque profile selected for a particular operation including but not limited to raising and lower the jack up rig legs, equalizing a load between all jack up rig legs attached to a single jack up rig platform and to perform and testing each one of the jack up rig legs for punch though on the ocean floor. In another embodiment of the present system, a neural network computer program is provided to learn a successful torque profile for sent to the individual gear box processors from the jack up rig controller as indicated by a torque profile selected for a particular operation including but not limited to raising and lower the jack up rig legs, equalizing a load between all jack up rig legs attached to a single jack up rig platform and to perform and testing each one of the jack up rig legs for punch though on the ocean floor. In another particular embodiment, the torque profiles are dynamically recalculated for changes in the acceptable stability parameters for longitudinal and transverse stability of the jack up rig platform. Changes in the acceptable stability parameters can occur to changes in loading and damage of the jack up rig platform or one of the jack up rig legs or gearbox motors. If a single gearbox motor goes down on a leg, the load is redistributed among the remaining working gearbox motors on the leg with the failed gearbox motor and still perform control of the gearbox motors in accordance with a selected torque profile.

In one particular embodiment, a torque profile is selected to apply a sharp rise in torque applied by the gearbox motors on the jack up rig leg to rapidly increase torque applied to a jack up rig chord and thereby rapidly increase pressure applied by the jack up rig leg on the ocean floor to test for punch through of the jack up rig leg on the ocean floor (also referred to herein as a "sea bed"). The stored battery backup power is applied to the winch to achieve a more rapid rise in torque exerted by the winch than possible using the electric generator power by itself. In another particular embodiment, a torque profile is selected to apply a sharp rise in torque on the winch to rapidly increase current to the gearbox torque. In another particular embodiment, a neural network is provided to monitor tension and torque applied during raising and lower the jack up rig legs, equalizing a load between all jack up rig legs attached to a single jack up rig platform and testing each one of the jack up rig legs for punch though on the ocean floor. The neural network stores the monitored tension and torque settings and applies the stored tension and torque settings to the winch during raising and lower the jack up rig legs, equalizing a load between all jack up rig legs attached to a single jack up rig platform and testing each one of the jack up rig legs for punch though on the ocean floor. In another particular embodiment, a neural network is provided to monitor tension and torque applied during raising and lower the jack up rig legs, equalizing a load between all jack up rig legs attached to a single jack up rig platform and testing each one of the jack up rig legs for punch though on the ocean floor under changing acceptable platform stability parameters due to changes in loading of the jack up rig platform, severe weather or damage to the jack up rig platform. The neural network stores the monitored load, speed reference set points, current and torque settings for all gearbox motors and applies the stored load, speed reference set points, current and torque settings to the gearbox motors during raising and lower the jack up rig legs, equalizing a load between all jack up rig legs attached to a single jack up rig platform and testing each one of the jack up rig legs for punch though on the ocean floor. User inputs and commands to the torque processor from an operator are performed using a graphical user interface (not shown) in data communication with the jack up rig processor and the torque control processor.

In another particular illustrative embodiment of the invention a jack up rig control system is provided including but not limited to a jack up processor in data communication with each of one of a plurality of gearbox motors over a first unidirectional data link for sending speed reference data to the plurality of gear box motors on the jack up rig leg to raise and lower a jack up rig leg; and a second unidirectional data link for load data from a sensor on each one of the gear box motors at the controller from the plurality of gearbox motors on the jack up rig leg. In another embodiment of the invention, the sensor reads a load value on the gearbox motor to which the sensor is attached. In another embodiment of the invention, the sensor is a sensor processor and computer readable medium. In another embodiment of the invention, the controller further includes but is not limited to a computer program stored in a non-transitory computer readable medium, wherein the computer program comprises instructions to send over the first unidirectional data link, speed reference set point data to each one the plurality of gear box motors on a jack up rig leg; and instructions to receive a load value over the first unidirectional data link at the jack up rig processor from sensor at each one of the plurality of gearbox motors on the jack up rig leg. In another embodiment of the invention, the computer program further includes but is not limited to instructions to control a speed for each of the gear box motors based on the speed reference data received at the controller.

In another embodiment of the invention, a method is provided that includes but is not limited to sending speed reference data from a controller in data communication over a first unidirectional data link to a plurality of gearbox motors on a jack up rig leg; receiving speed reference data at the controller from the plurality of gear box motors on the jack up rig leg over a second unidirectional data link; and sending a speed for each of the gear box motors based on the speed reference data received at the controller to equalize a load on each one of the plurality of gear boxes.

In another illustrative embodiment of the invention the processor and neural network perform geotechnical investigations of the ocean floor at a proposed jack up rig location to test for punch through and foot prints left by prior installations of a jack up rig. In another illustrative embodiment of the invention the processor and neural network refer to prior geotechnical investigations of the ocean floor at a proposed jack up rig location to determine a punch through pressure to determine punch through and foot prints left by prior installations of a jack up rig. The footprints of a prior installation leave a softer and less supportive ocean floor to be avoided during installation of a jack up rig's legs. Geotechnical investigations of the ocean floor are well known in the art. Geotechnical investigations are disclosed in numerous patents including but not limited to U.S. Pat. No. 4,128,011 by Savage entitled "Investigation of the Soundness of Structures" and U.S. Pat. No. 5,804,715 by Bennet entitled "Hydrodynamic Dampening System for the Precise Measurement of Dynamic Sediment Pore Water Pressure", all of which are hereby incorporated by reference in their entirety.

The geotechnical investigations indicate punch through conditions and foot prints from prior jack up rig installations. Geotechnical investigations are conducted using push samplers, percussion samplers and torque profile samplers. There commercially available software programs such as the Jurig3 program that computes of penetration into an ocean floor as a function of loading a jack up rig.

In a particular illustrative embodiment of the invention, the legs are dynamically preloaded by sending a torque profile to the gear box motors on each leg supporting the jack up rig. Geotechnical surveys data and torque profiles data for foot prints and a torque profile stored in the computer readable medium is retrieved and sent to each one of the jack up rig legs to test for punch through. Geotechnical surveys data and torque profiles data for punch through pressure and a torque profile stored in the computer readable medium is retrieved and sent to each one of the jack up rig legs to determine pressure for punch through. The geotechnical survey data for the site of the jack up rig installation is retrieved from a stored value in the geotechnical survey data base in the computer readable medium. In another illustrative embodiment of the invention, a punch through pressure is predicted from the geotechnical survey data. In another embodiment of the invention, a foot print is detected from the geotechnical survey data taken from the geotechnical survey data for the jack up rig site location. In another embodiment of the invention, ocean floor punch through pressure for the site of the jack up rig installation site location is retrieved from a stored value in the geotechnical survey data base in the computer readable medium for the site of the jack up rig installation site location.

In another particular illustrative embodiment of the invention, the neural network is trained using the geotechnical survey data. The neural network is trained to sense punch through for the site of the jack up rig installation site location using the geotechnical survey data. The neural network is trained to sense a load imbalance between the legs supporting the jack up rig platform for the site of the jack up rig installation site location using the geotechnical survey data. The neural network is trained to send a torque profile to correct the load imbalance between the legs supporting the jack up rig platform for the site of the jack up rig installation site location using the geotechnical survey data. A load imbalance between the jack up rig legs occurs when one of the legs punches through the ocean floor supporting the jack up rig legs. In a particular illustrative embodiment of the invention, the system processor executes instructions in the computer program to react quickly to the punch through and balances the load on the legs by extending the leg that punches through downward until the leg is loaded equally with the remaining legs on the jack up rig. In a particular illustrative embodiment of the invention, the neural network reacts quickly to the punch through condition and balances the load on the legs by extending the leg that punches through downward until the leg is loaded equally with the remaining legs on the jack up rig.

In a particular illustrative embodiment of the invention, the system processor executes instructions in the computer program to react quickly to punch through detection and balances the load on the legs by extending the leg that punches through downward until the leg is loaded equally with the remaining legs on the jack up rig. In a particular illustrative embodiment of the invention, the neural network reacts quickly to the punch through condition and balances the load on the legs by extending the leg that punches through downward until the leg is loaded equally with the remaining legs on the jack up rig.

In a particular illustrative embodiment of the invention, the system processor executes instructions in the computer program to react quickly to foot print detection and balances the load on the legs by extending the leg that punches through downward, until the leg is loaded equally with the remaining legs on the jack up rig. In a particular illustrative embodiment of the invention, the neural network reacts quickly to the foot print detection and balances the load on the legs by extending the leg that lands in the foot print, downward until the leg is loaded equally with the remaining legs on the jack up rig.

In another illustrative embodiment of the invention, a torque profile is sent from the processor to the jack up rig legs to simulate wave motion to determine the stability of the platform. A height of the platform above the water level is adjusted to ensure that the platform stays above water level during a wave of the magnitude simulated by the torque profile. In another illustrative embodiment of the invention, a torque profile is sent from the processor to the jack up rig legs to simulate earth quake motion to determine the stability of the platform. A height of the platform above the water level is adjusted to ensure that the platform stays above water level during an earthquake of the magnitude simulated by the torque profile.

In a particular illustrative embodiment, the jack up rig processor determines a rate of descent for a jack up rig leg during punch through an ocean floor. The jack up rig processor reads and receives current, speed, load and torque data from the sensors on the gearboxes on each of the jack up rig legs for current, speed, load and torque. When a sudden change in the current, speed, load and torque data from the sensors on a jack up rig leg indicates that the jack up rig leg has punched through the ocean floor the jack up rig processor sends a torque profile to counteract the rate of change in current, speed, load and torque from the leg caused by the leg punching through the ocean floor. Thus, when the jack up rig legs begins punching through the ocean floor, the jack up rig processor receives data from the sensors indicating a rate of descent of the jack up rig leg through the ocean floor and sends a torque profile command to the gear motor processors on the leg to extend the leg downward into the hole created by the punch through until the punch through is counteracted and the load is again balanced on the legs supporting the jack up rig platform. The jack up rig selects a stored torque profile for the current operation raising and lower legs when one of the jack up rig legs is stuck or additional impulse power is desired to test an ocean floor for punch throw on a particular jack up rig leg. The rate of change in the current, speed, load and torque data caused by a punch through is counteracted by the jack up rig processor. The jack up rig processor also counteracts changes in the current, speed, load and torque data on the jack up rig legs caused footprints, waves and earthquakes. The jack up rig processor monitors the current, speed, load and torque data for the jack up rig legs in real time and sends counteractive torque, current, speed and load commands and torque profiles to the jack up rig legs in real time to dynamically maintain a load balance between the jack up rig legs in real time during punch through, waves, footprints and earthquakes.

In another particular illustrative embodiment, when a punch through or footprint is detected, the rate of descension of a jack up rig leg is counteracted by a counteractive torque, current, speed and load commands and torque profiles to the jack up rig legs in real time to dynamically maintain a load balance between the jack up rig legs in real time during punch through, waves, footprints and earthquakes. For example, when the processor determines that a leg is punching through and descending into the hole in the ocean floor created by the punch though at a rate of 1 foot per second, the processor sends a sends counteractive torque, current, speed and load command and torque profile command to the leg to extend the leg at 1 foot per second to counteract the leg descending into the punch through hole until the load is balanced between the legs of the jack up rig.

In a particular illustrative embodiment of the invention, a jack up rig control system is disclosed including but not limited to a jack up rig having a platform supported by a plurality of legs; a jack up processor in data communication with each of one of a plurality of gear box motors on the plurality of legs to raise and lower each of the jack up rig legs independently;

a first data link for sending speed reference data to the plurality of gear box motors on the plurality of legs to raise and lower each of the jack up rig legs independently; a second unidirectional data link for receiving load data at the jack-up rig processor, from each of a plurality of sensors on each one of the jack up rig legs, wherein each one of the plurality of sensors is a sensor on each one of the gear box motors from the plurality of gear box motors on each one of the jack up rig legs; a computer program stored in a computer readable medium comprising instructions that are executed by the jack-up rig processor, the computer program further including but not limited to instructions to read data from sensors over the second data link on each of the gear box motors for a load on each of the gear box motors;

instructions to select a stored torque profile from the computer readable medium based on the load data from the sensors; and instructions to send the torque profile to the plurality of gearboxes. In another particular illustrative embodiment of the invention, the stored torque profile is a torque verses time relationship. In another particular illustrative embodiment of the invention, the stored torque profile further comprises instructions to apply additional impulse power from a battery.

In another particular illustrative embodiment of the invention, the computer program further includes but is not limited to instructions to apply the torque profile individually to each one of the gearbox processors to test an ocean floor under each one of the jack up rig legs for punch throw on each one of the plurality of jack up rig legs. In another particular illustrative embodiment of the invention, the computer program further includes but is not limited to instructions to apply the torque profile further comprise instructions to provide additional impulse power from a battery to each one of the gearbox processors to test the ocean floor for punch throw on the particular jack up rig leg when the jack up rig leg is stuck. In another particular illustrative embodiment of the invention, the computer program further includes but is not limited to instructions to sense a load imbalance between one of the plurality of jack up rig legs and the remaining legs of the jack up rig legs supporting the platform; and instructions to send additional impulse power in a selected torque profile to each one of the gearbox processors on the particular jack up rig leg to balance the platform load between the one jack up rig leg and the other jack up rig legs supporting the platform.

In another particular illustrative embodiment of the invention, the stored torque profile defines a tension versus time for applying torque to each of the plurality of gearbox motors.

In another particular illustrative embodiment of the invention, the computer program further includes but is not limited to the system further includes but is not limited to a gear box motor sensor on each of the gear box motors, the computer program further comprising instructions to read each of the gear box motor sensors for current, speed, load and torque. In another particular illustrative embodiment of the invention, the computer program further includes but is not limited to instructions to determine that a current value for a first one of the plurality gearbox motors on one of the plurality of legs is less than half of the current values for a top six current values for the plurality of gearbox motors on the leg; and instructions to send a speed set point command to the first one gearbox motor to cause the first one gearbox motor to engage the leg.

In another particular illustrative embodiment of the invention, the computer program further includes but is not limited to instructions to send a speed set point command to adjust a load on each one of gearbox motors on the one single jack up rig leg so that the load on the single jack up rig leg is shared equally between all working gearbox motors on the single jack up rig leg. In another particular illustrative embodiment of the invention, the computer program further includes but is not limited to instructions to select a stored torque profile to each one of the jack up rig legs to test an ocean floor for punch throw for each one of the plurality of jack up rig legs.

In another particular illustrative embodiment of the invention, the computer program further includes but is not limited to instructions to send a stored torque profile to the gear box motors on one of the plurality of jack up rig legs when one of the jack up rig legs punches throw the ocean floor. In another particular illustrative embodiment of the invention, the computer program further includes but is not limited to a neural network stored in the computer readable medium, wherein the neural network monitors tension and torque applied during testing each one of the jack up rig legs for punch though on the ocean floor. In another particular illustrative embodiment of the invention, the computer program further includes but is not limited to the neural network monitors the equalizing of a load between the plurality of jack up rig legs attached to a single jack up rig platform during testing each one of the jack up rig legs for punch though on the ocean floor under changing acceptable platform stability parameters due to changes in loading of the jack up rig platform during punch through, wherein the neural network stores the monitored load, speed reference set points, current and torque settings for all gearbox motors and applies the stored load, speed reference set points, current and torque settings to the gearbox motors during raising and lower the jack up rig legs. In another particular illustrative embodiment of the invention, the computer program further includes but is not limited to the neural network senses an imbalance between the loads on the jack up rig legs and sends speed reference commands to the gear box motors to equalize a load between all jack up rig legs.

In another particular illustrative embodiment of the invention, the computer program further includes but is not limited to the neural network senses an imbalance between the loads on the jack up rig legs and sends a torque profile comprising speed reference commands to the gear box motors to equalize a load between all jack up rig legs and equalizes a load between all jack up rig legs during punch though on the ocean floor. In another particular illustrative embodiment of the invention, the computer program further includes but is not limited to the neural network senses an imbalance between the loads on the jack up rig legs and sends a torque profile comprising speed reference commands to the gear box motors to equalize a load between all jack up rig legs and equalizes a load between all jack up rig legs when one of the jack up rig legs is stuck in the ocean floor.

In another particular illustrative embodiment of the invention, a computer readable medium is disclosed containing a computer program comprising instructions that are executed by a processor for controlling a jack up rig, the computer program including but not limited to instructions to read data from sensors over the second data link on each of the gear box motors for a load on each of the gear box motors; instructions to select a stored torque profile from the computer readable medium based on the load data from the sensors; instructions to send the torque profile to the plurality of gearboxes, wherein the stored torque profile is a torque verses time relationship; instructions to apply additional impulse power from a battery; instructions to apply the torque profile individually to each one of the gearbox processors to test an ocean floor under each one of the jack up rig legs for punch throw on each one of the plurality of jack up rig legs; instructions to sense a load imbalance between one of the plurality of jack up rig legs and the remaining legs of the jack up rig legs supporting the platform; and instructions to send additional impulse power in a selected torque profile to each one of the gearbox processors on the particular jack up rig leg to balance the platform load between the one jack up rig leg and the other jack up rig legs supporting the platform.

In another particular illustrative embodiment of the invention, the computer program further includes but is not limited to instructions to apply the torque profile further comprise instructions to provide additional impulse power from a battery to each one of the gearbox processors to test the ocean floor for punch throw on the particular jack up rig leg when the jack up rig leg is stuck. In another particular illustrative embodiment of the invention, the computer program further includes but is not limited to A neural network for controlling a jack up rig stored in a computer readable medium, the neural network comprising: a neural network stored in the computer readable medium, wherein the neural network monitors tension and torque applied during testing each one of the jack up rig legs for punch though on the ocean floor, wherein the neural network monitors the equalizing of a load between the plurality of jack up rig legs attached to a single jack up rig platform during testing each one of the jack up rig legs for punch though on the ocean floor under changing acceptable platform stability parameters due to changes in loading of the jack up rig platform during punch through, wherein the neural network stores the monitored load, speed reference set points, current and torque settings for all gearbox motors and applies the stored load, speed reference set points, current and torque settings to the gearbox motors during raising and lower the jack up rig legs, and the neural network senses an imbalance between the loads on the jack up rig legs and sends speed reference commands to the gear box motors to equalize a load between all jack up rig legs and the neural network senses an imbalance between the loads on the jack up rig legs and sends a torque profile comprising speed reference commands to the gear box motors to equalize a load between all jack up rig legs and equalizes a load between all jack up rig legs during punch though on the ocean floor.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A jack up rig control system comprising:
a jack up rig having a platform supported by a plurality of legs;
a jack up processor in data communication with each of one of a plurality of gear box motors on the plurality of legs to raise and lower each of the jack up rig legs independently;
a first data link for sending speed reference data to the plurality of gear box motors on the plurality of legs to raise and lower each of the jack up rig legs independently;
a second unidirectional data link for receiving load data at the jack-up rig processor, from each of a plurality of sensors on each one of the jack up rig legs, wherein each one of the plurality of sensors is a sensor on each one of the gear box motors from the plurality of gear box motors on each one of the jack up rig legs;
a computer program stored in a computer readable medium comprising instructions that are executed by the jack-up rig processor, the computer program further comprising:
instructions to read data from sensors over the second data link on each of the gear box motors for a load on each of the gear box motors;
instructions to select a stored torque profile from the computer readable medium based on the load data from the sensors;
instructions to send the torque profile to the plurality of gearboxes; and
instructions to apply the torque profile individually to each one of the gearbox motors to test an ocean floor under each one of the jack up rig legs for punch through on each one of the plurality of jack up rig legs.

2. The system of claim 1, wherein the stored torque profile is a torque verses time relationship.

3. The system of claim 2, wherein the stored torque profile further comprises instructions to apply additional impulse power from a battery,
instructions to apply the torque profile individually to each one of the gearbox processors to test an ocean floor under each one of the jack up rig legs for punch throw on each one of the plurality of jack up rig legs.

4. The system of claim 2 wherein stored torque profile defines a tension versus time for applying torque to each of the plurality of gearbox motors.

5. The system of claim 4, the computer program further comprising:
instructions to apply the torque profile further comprise instructions to provide additional impulse power from a battery to each one of the gearbox processors to test the ocean floor for punch through on the particular jack up rig leg when the jack up rig leg is stuck.

6. The system of claim 1, the computer program further comprising:
instructions to sense a load imbalance between one of the plurality of jack up rig legs and the remaining legs of the jack up rig legs supporting the platform; and
instructions to send additional impulse power in a selected torque profile to each one of the gearbox motors on the particular jack up rig leg to balance the platform load between the one jack up rig leg and the other jack up rig legs supporting the platform.

7. The system of claim 1, the system further comprising:
a gear box motor sensor on each of the gear box motors, the computer program further comprising instructions to read each of the gear box motor sensors for current, speed, load and torque.

8. The system of claim 1, the computer program further comprising:
instructions to determine that a current value for a first one of the plurality gearbox motors on one of the plurality of legs is less than half of the current values for a top six current values for the plurality of gearbox motors on the leg; and
instructions to send a speed set point command to the first one gearbox motor to cause the first one gearbox motor to engage the leg.

9. The system of claim 1, the computer program further comprising:
instructions to send a speed set point command to adjust a load on each one of gearbox motors on the one single jack up rig leg so that the load on the single jack up rig leg is shared equally between all working gearbox motors on the single jack up rig leg.

10. The system of claim 9, the computer program further comprising:
instructions to select a stored torque profile to each one of the jack up rig legs to test an ocean floor for punch through for each one of the plurality of jack up rig legs.

11. The system of claim 9, the computer program further comprising:
instructions to send a stored torque profile to the gear box motors on one of the plurality of jack up rig legs when one of the jack up rig legs punches through the ocean floor.

12. The system of claim 1, the system further comprising:
a neural network stored in the computer readable medium, wherein the neural network monitors tension and torque applied during testing each one of the jack up rig legs for punch through on the ocean floor.

13. The system of claim 12, wherein the neural network monitors the equalizing of a load between the plurality of jack up rig legs attached to a single jack up rig platform during testing each one of the jack up rig legs for punch though on the ocean floor under changing acceptable platform stability parameters due to changes in loading of the jack up rig platform during punch through, wherein the neural network stores the monitored load, speed reference set points, current and torque settings for all gearbox motors and applies the stored load, speed reference set points, current and torque settings to the gearbox motors during raising and lower the jack up rig legs.

14. The system of claim 13, wherein the neural network senses an imbalance between the loads on the jack up rig legs and sends a torque profile comprising speed reference commands to the gear box motors to equalize a load between all jack up rig legs and equalizes a load between all jack up rig legs during punch through on the ocean floor.

15. The system of claim 14, wherein the neural network senses an imbalance between the loads on the jack up rig legs and sends a torque profile comprising speed reference commands to the gear box motors to equalize a load between all jack up rig legs and equalizes a load between all jack up rig legs when one of the jack up rig legs is stuck in the ocean floor.

16. The system of claim 1, wherein the computer program further comprises:
instructions to refer to prior geotechnical data from prior geotechnical investigations of the ocean floor at a proposed jack up rig location to determine punch through pressure for the site of the jack up rig installation site location wherein the geotechnical is retrieved from a stored value in the geotechnical survey data base in the computer readable medium for the site of the jack up rig installation site location.

17. The system of claim 16, further comprising instructions to reacts quickly to the punch through condition and balance the load on the legs by extending the leg that punches through downward until the leg is loaded equally with the remaining legs on the jack up rig.

18. The system of claim 17, the computer program further comprising:
instructions to read and receives current, speed, load and torque data from the sensors on the gearboxes on the jack up rig legs for current, speed, load and torque;
instructions to when a sudden change in the current, speed, load and torque data from the sensors on a jack up rig leg indicates that the jack up rig leg has punched through the ocean floor the jack up rig processor, instructions send a torque profile to counteract the rate of change in current, speed, load and torque from the leg caused by the leg punching through the ocean floor, wherein when the processor determines that a leg is punching through and descending into the hole in the ocean floor created by the punch though at a rate of 1 foot per second, the processor sends a sends counteractive torque, current, speed and load command and torque profile command to the leg to extend the leg at 1 foot per second to counteract the leg descending into the punch through hole until the load is balanced between the legs of the jack up rig.

19. A computer readable medium containing a computer program comprising instructions that are executed by a processor for controlling a jack up rig, the computer program comprising:
instructions to read data from sensors over a first data link on each of a plurality of gear box motors for a load on each of the plurality of gear box motors;
instructions to select a stored torque profile from the computer readable medium based on load data from the sensors;
instructions to send the torque profile to the plurality of gearbox motors over a second data link, wherein the stored torque profile is a torque verses time relationship;
instructions to apply additional impulse power from a battery;
instructions to apply the torque profile individually to each one of the plurality of gearbox motors to test an ocean floor under each one of the jack up rig legs for punch through on each one of the plurality of jack up rig legs;
instructions to sense a load imbalance between one of the plurality of jack up rig legs and the remaining legs of the jack up rig legs supporting the platform; and
instructions to send additional impulse power in a selected torque profile to each one of the gearbox processors on the particular jack up rig leg to balance the platform load between the one jack up rig leg and the other jack up rig legs supporting the platform.

* * * * *